United States Patent
Moriki et al.

(10) Patent No.: US 8,935,031 B2
(45) Date of Patent: Jan. 13, 2015

(54) CONSTRUCTION VEHICLE CONTROL APPARATUS AND CONSTRUCTION VEHICLE

(75) Inventors: Hidekazu Moriki, Hitachinaka (JP); Satoru Kaneko, Naka (JP); Takashi Ikimi, Hitachi (JP); Noritaka Ito, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/979,457

(22) PCT Filed: Jan. 20, 2012

(86) PCT No.: PCT/JP2012/051256
§ 371 (c)(1),
(2), (4) Date: Jul. 12, 2013

(87) PCT Pub. No.: WO2012/099255
PCT Pub. Date: Jul. 26, 2012

(65) Prior Publication Data
US 2013/0304292 A1    Nov. 14, 2013

(30) Foreign Application Priority Data
Jan. 21, 2011    (JP) .................................. 2011-011215

(51) Int. Cl.
*B60L 11/00*     (2006.01)
*B60W 10/196*    (2012.01)
(Continued)

(52) U.S. Cl.
CPC ................ *B60W 10/196* (2013.01); *B60L 7/14* (2013.01); *B60L 7/26* (2013.01); *B60L 11/005* (2013.01); *B60L 11/123* (2013.01); *B60L 15/2009* (2013.01); *B60W 10/06* (2013.01); *B60W 10/08* (2013.01); *B60W 10/184* (2013.01); *B60W 20/00* (2013.01); *B60W 30/18127* (2013.01); *E02F 9/2075* (2013.01); *E02F 9/2083* (2013.01); *B60W 10/188* (2013.01);
(Continued)

(58) Field of Classification Search
None
See application file for complete search history.

(56) References Cited

U.S. PATENT DOCUMENTS 6,986,727 B2 *    1/2006    Kuras et al. ....................... 477/4
2010/0186404 A1 *    7/2010    Yasufuku et al. ............... 60/459

FOREIGN PATENT DOCUMENTS

| JP | 59-208140 | 11/1984 |
|----|-----------|---------|
| JP | 2000-291451 | 10/2000 |

(Continued)

*Primary Examiner* — Thomas Tarcza
*Assistant Examiner* — Garrett Evans
(74) *Attorney, Agent, or Firm* — Antonelli, Terry, Stout & Kraus, LLP.

(57) ABSTRACT

A construction vehicle control apparatus is provided including: a motor generator control unit (160) which, when regenerative electrical power generated by a motor (7) during regenerative braking surpasses acceptable charging electrical power of a capacitor (3), drives a motor generator (5) using the surplus electrical power; an engine controller (2) which detects the rotating speed of an engine (1); a motor control unit (180) which, if the rotating speed of the engine becomes larger than a second set value while the motor generator is being driven by the surplus electrical power, reduces regenerative torque generated by the motor; and a brake control unit (190) which, if the rotating speed of the engine becomes larger than the second set value while the motor generator is being driven by the surplus electrical power, increases regenerative torque generated by a hydraulic brake (30).

4 Claims, 8 Drawing Sheets

(51) Int. Cl.

| | | |
|---|---|---|
| *B60L 7/14* | (2006.01) | |
| *B60L 7/26* | (2006.01) | |
| *B60L 11/12* | (2006.01) | |
| *B60L 15/20* | (2006.01) | |
| *B60W 10/06* | (2006.01) | |
| *B60W 10/08* | (2006.01) | |
| *B60W 10/184* | (2012.01) | |
| *B60W 20/00* | (2006.01) | |
| *B60W 30/18* | (2012.01) | |
| *E02F 9/20* | (2006.01) | |
| *B60W 10/188* | (2012.01) | |

(52) U.S. Cl.
CPC ......... *B60L 2200/40* (2013.01); *B60L 2210/10* (2013.01); *B60L 2210/40* (2013.01); *B60L 2240/423* (2013.01); *B60L 2240/441* (2013.01); *B60T 2270/604* (2013.01); *B60W 20/1062* (2013.01); *B60W 2510/0638* (2013.01); *B60W 2510/085* (2013.01); *B60W 2510/244* (2013.01); *B60W 2710/086* (2013.01); *B60W 2710/182* (2013.01); *B60Y 2200/412* (2013.01); *Y02T 10/6286* (2013.01); *Y02T 10/7077* (2013.01); *Y02T 10/7241* (2013.01); *Y02T 10/7022* (2013.01); *Y02T 10/7216* (2013.01); *Y02T 10/642* (2013.01); *B60W 2600/00* (2013.01); *Y02T 10/6217* (2013.01); *B60L 2240/12* (2013.01); *B60L 2240/421* (2013.01); *B60L 2240/443* (2013.01); *B60L 2260/28* (2013.01)
USPC .......................................................... 701/22

(56) References Cited

FOREIGN PATENT DOCUMENTS

| JP | 2001-207482 | 8/2001 |
|---|---|---|
| JP | 2002-238105 | 8/2002 |
| JP | 2002-285970 | 10/2002 |

* cited by examiner

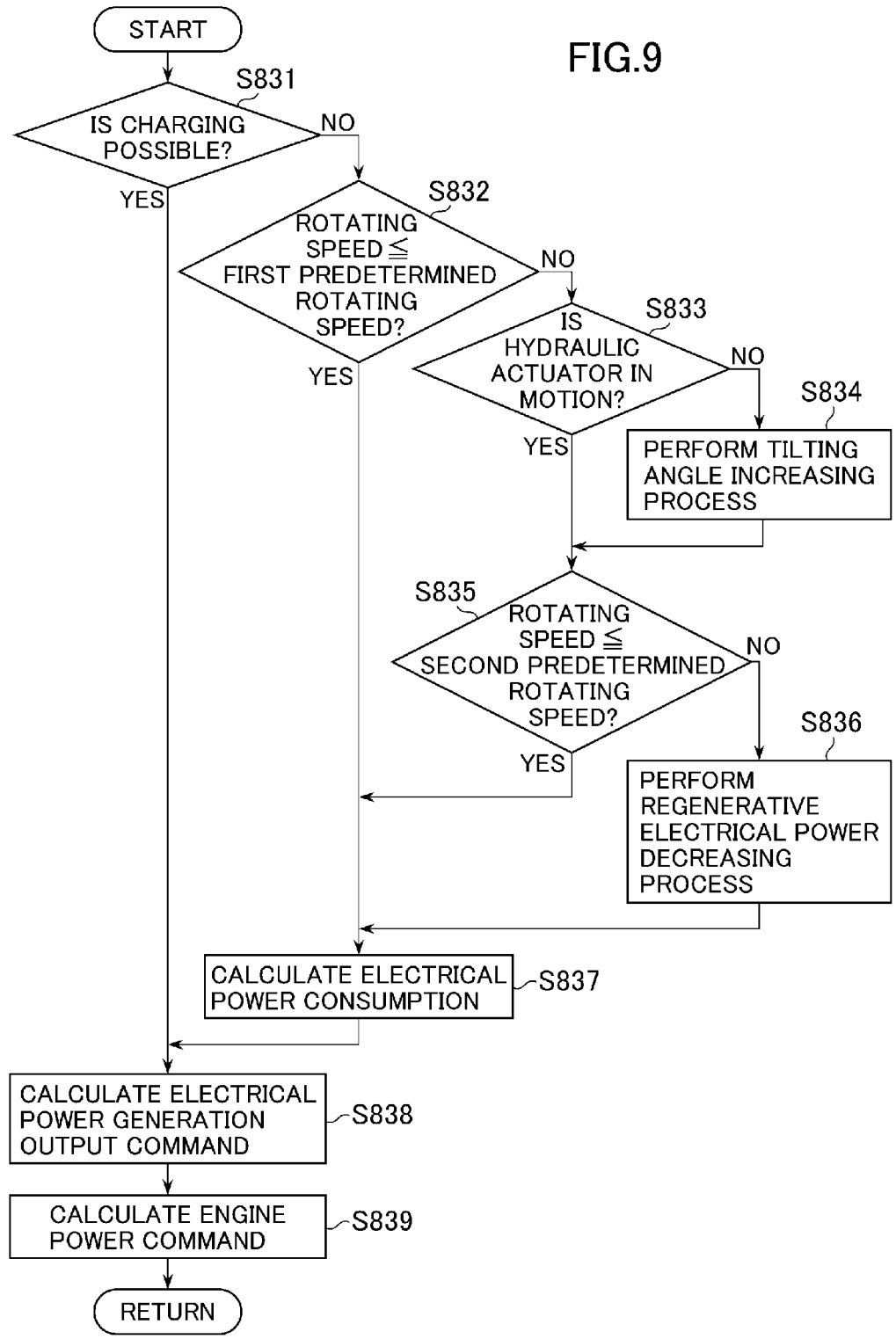

CONSTRUCTION VEHICLE CONTROL APPARATUS AND CONSTRUCTION VEHICLE

TECHNICAL FIELD

The present invention relates to a construction vehicle control apparatus and a construction vehicle.

BACKGROUND ART

Among hybrid vehicles running on both an engine (internal combustion engine) and an electrical motor, a series hybrid electrical vehicle is a vehicle that has its electrical motor working as a power source for traveling and that is supplied with electrical power from a generator connected mechanically with its engine. This type of series hybrid electrical vehicle allows the electrical motor to generate braking power through regenerative braking, which can reduce load distribution on friction brakes (i.e., braking device) and thereby lower their attrition. Also, the regenerative electrical power produced by regenerative braking is charged into an electrical storage device for effective use in powering the electrical motor so that fuel consumption may be reduced.

However, when regenerative electrical power turns out to be greater than charging electrical power acceptable to the electrical storage device (i.e., acceptable charging electrical power), regenerative braking power may be limited to protect the electrical storage device. Then the load distribution on the friction brakes is increased to make up for the amount by which the regenerative braking power is limited, which can promote the attrition of the friction brakes.

In view of the problem above, it has been proposed that the above-mentioned technical structure should have the generator replaced with a motor generator capable of rotating the engine so as to reduce the load distribution on the friction brakes. When excess regenerative electrical power that cannot be charged into the electrical storage device is generated, the excess regenerative electrical power is used to let the motor generator rotate the engine so that excess electrical power may be consumed by engine braking (see JP-2000-291451-A). This literature also describes a technique by which, if regenerative electrical power is more than what can be consumed by engine braking, an exhaust valve is closed to increase the load torque of the engine so that greater regenerative electrical power is consumed than when the exhaust value is left open, which prevents over speed of the engine.

PRIOR ART LITERATURE

Patent Literature

Patent Literature

JP-2000-291451-A

SUMMARY OF THE INVENTION

Problem to be Solved by the Invention

Incidentally, some construction vehicles designed for excavation operation, cargo handling operation or the like (e.g., wheel loader, forklift, wheel mounted hydraulic excavator) are equipped with a hydraulic actuator, a hydraulic pump for driving the hydraulic actuator, and a motor generator connected mechanically to the hydraulic pump. However, it is difficult to apply without modification the invention described in the above-cited literature to these construction vehicles in order to reduce the attrition of their braking devices. That is because the above-cited invention is intended to be applied to motorcars and needs suitable modifications if applied to construction vehicles in view of their specificities. The construction vehicles are each designed primarily to carry out operations with a working device that uses a hydraulic actuator. Thus as opposed to motorcars whose major purpose is to travel at high speed, the construction vehicles often travel short distances and repeat acceleration and braking at short intervals. Also, when carrying a cargo, the construction vehicle takes on a heavy gross weight that requires larger braking torque than motorcars. For these reasons, the construction vehicles suffer heavy attrition of their braking devices compared with motorcars. Thus it is desired for the construction vehicles, more than for motorcars, to reduce as much as possible the occasions on which they utilize their braking devices for braking purposes.

An object of the present invention is to provide a control apparatus for a construction vehicle furnished with a motor generator connected mechanically to a hydraulic pump for driving a hydraulic actuator, the control apparatus being capable of reducing the attrition of the braking device of the construction vehicle.

Means for Solving the Problem

In achieving the above-mentioned object, the present invention provides a control apparatus for a construction vehicle equipped with an electrical storage device, a motor generator connected mechanically to an engine, a hydraulic pump connected mechanically to the motor generator, a hydraulic actuator driven by fluid supplied from the hydraulic pump, a motor which is connected to the electrical storage device and to the motor generator by electrical power lines and which drives wheels, and a braking device for braking revolutions of the wheels, the control apparatus including: a motor generator control unit which, when regenerative electrical power generated by the motor during regenerative braking surpasses acceptable charging electrical power of the electrical storage device, drives the motor generator using the surplus electrical power; a motor control unit which, if the rotating speed of the engine, the motor generator, or the hydraulic pump becomes larger than a set value while the motor generator is being driven by the surplus electrical power, reduces regenerative torque generated by the motor; and a brake control unit which, if the rotating speed of the engine, the motor generator, or the hydraulic pump becomes larger than the set value while the motor generator is being driven by the surplus electrical power, increases braking torque generated by the braking device.

Effects of the Invention

According to the present invention, it is possible to reduce the occasions on which the braking device is operated when surplus regenerative electrical power that cannot be charged into the electrical storage device is generated, which contributes to reducing the attrition of the braking device.

BRIEF DESCRIPTION OF THE DRAWINGS

FIG. 9 is a specific flowchart of regenerative control performed in step 83 by the first embodiment of the present invention.

MODE FOR CARRYING OUT THE INVENTION

Figure 1:
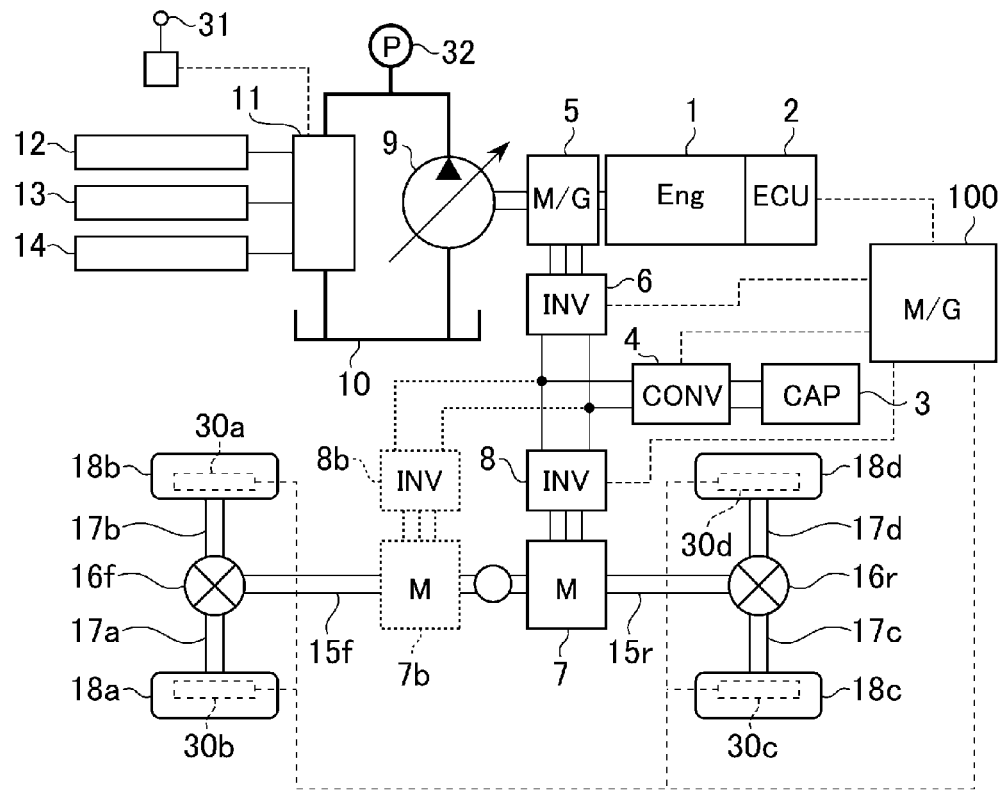
FIG. 1 is a block diagram of a construction vehicle associated with a first embodiment of the present invention.
Figure 2:
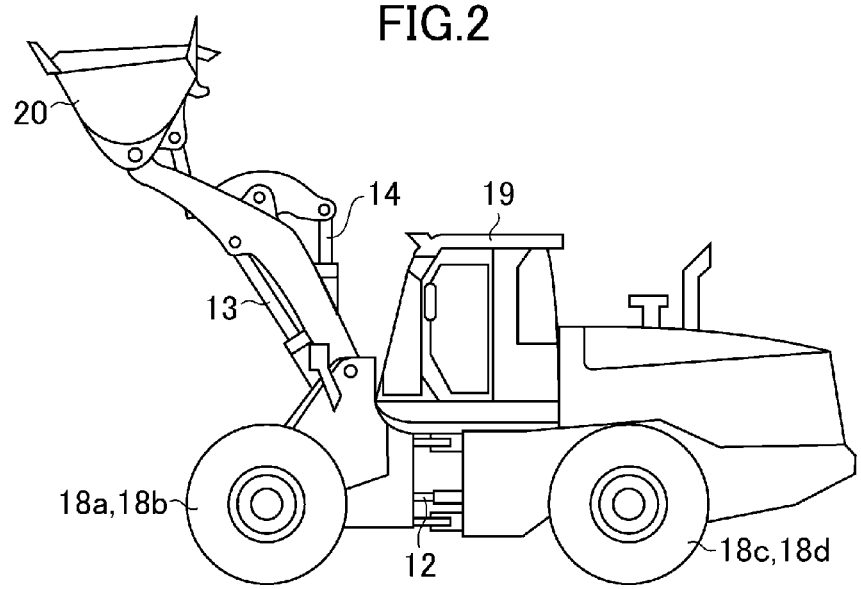
FIG. 2 is a side view of the construction vehicle associated with the first embodiment of the present invention.

Some embodiments of the present invention are explained below in reference to the accompanying drawings. FIG. 1 is a block diagram of a construction vehicle associated with the first embodiment of the present invention, and FIG. 2 is a side view of this construction vehicle. In these drawings, the construction vehicle includes a main controller (main control device) 100, an engine 1, an engine controller (engine control device) 2 for controlling the engine 1, a capacitor (electrical storage device) 3, a converter 4 for controlling the charging and discharging of the capacitor 3, a motor generator 5 connected mechanically to the engine 1, a generator inverter 6 for driving the motor generator 5, a hydraulic pump 9 connected mechanically to the motor generator 5; a steering cylinder 12, a lift cylinder 13 and a bucket cylinder 14 acting as hydraulic actuators driven by fluid supplied from the hydraulic pump 9, traveling motors 7 and 7b which are connected to the capacitor 3 and motor generator 5 by electrical power lines and which drive wheels 18a, 18b, 18c and 18d when supplied with electrical power from at least either the capacitor 3 or the motor generator 5, traveling inverters 8 and 8b for driving the traveling motors 7 and 7b respectively, and wet type hydraulic brakes (braking device) 30a, 30b, 30c and 30d for braking the revolutions of the wheels 18a, 18b, 18c and 18d.

The hydraulic pump 9 is a variable displacement hydraulic pump that can vary its capacity when changed in its tilting angle. As such, the hydraulic pump 9 feeds fluid in an oil tank 10 to a control valve 11. The tilting angle can be adjusted by a tilting angle control valve (regulator), not shown. The discharge rate of the hydraulic pump 9 with regard to the rotating speed can be controlled by adjusting the tilting angle of the pump to change the pump capacity. The control valve 11 is controlled by a signal (hydraulic signal or electrical signal) output from an operating device 31 (see FIG. 1) installed in an operator cab 19. The fluid supplied to the control valve 11 by the hydraulic pump 9 is suitably distributed to the hydraulic cylinders 12, 13 and 14 in keeping with the operations of the operating device 31. In this manner, the operator can handle the operating device 31 so as to control the extension and contraction of the individual hydraulic cylinders 12, 13 and 14.

Incidentally, the operating device 31 associated with this embodiment may include a steering wheel, a lift lever, and a bucket lever for extending and contracting the steering cylinder 12, the lift cylinder 13, and the bucket cylinder 14 respectively. Of these components, the lift lever and bucket lever (operating levers) are shown as the operating device 31 in FIG. 1. By handling the steering wheel, the operator can extend or contract the steering cylinder 12 to adjust the steering angle of the vehicle and thereby swivel the vehicle. And by manipulating the lift lever, bucket lever and the like, the operator can extend or contract the lift cylinder 13 and bucket cylinder 14 to control the height and tilt of a bucket 20 in excavation and cargo handling operations.

The converter 4, generator inverter 6, and traveling inverters 8 and 8b are connected to the same electrical power lines and can be supplied with power from one another. The converter 4 monitors the direct-current (DC) voltage of a smoothing capacitor (not shown) attached to the electrical power lines, charging and discharging the capacitor 3 in such a manner as to keep the DC voltage of the smoothing capacitor constant. Although this embodiment is configured to have a pair of traveling motors 7 and 7b and a pair of traveling inverters 8 and 8b, the number of these components is not limitative of this invention; there may be a configuration having one traveling motor and one traveling inverter, or a configuration involving four traveling motors and four traveling inverters, for example. For the purpose of simplifying the illustration, there is assumed hereunder a configuration that has one traveling motor 7 and one traveling inverter 8.

By operating an accelerator pedal, a brake pedal, and a forward-reverse switch (all not shown) in the operator cab 19, the operator can drive the wheels 18a, 18b, 18c and 18d to get the vehicle traveling. For acceleration during traveling, the traveling inverter 8 power-drives the traveling motor 7. The powering torque generated by the traveling motor 7 is transmitted to the wheels 18a, 18b, 18c and 18d via propeller shafts 15f and 15r, differential gears 16f and 16r, and drive shafts 17a, 17b, 17c and 17d, whereby the vehicle is accelerated. On the other hand, for braking during traveling, the traveling inverter 8 drives the traveling motor 7 as a generator. The regenerative torque (braking torque) generated by the traveling motor 7 is transmitted to the wheels 18a, 18b, 18c and 18d in the same manner as with the powering torque so as to decelerate the vehicle. Usually, the regenerative electrical power generated by the traveling motor 7 is charged into the capacitor 3. Also, the construction vehicle of this embodiment is furnished with a hydraulic brake control valve (not shown) and hydraulic brakes 30a, 30b, 30c and 30c. The hydraulic brakes 30a, 30b, 30c and 30c may be used to decelerate the vehicle as needed. Although it is explained hereunder that this embodiment uses hydraulic brakes as the braking device, mechanical brakes (e.g., disc brakes) for braking wheel revolutions by frictional force may be utilized instead.

Figure 3:
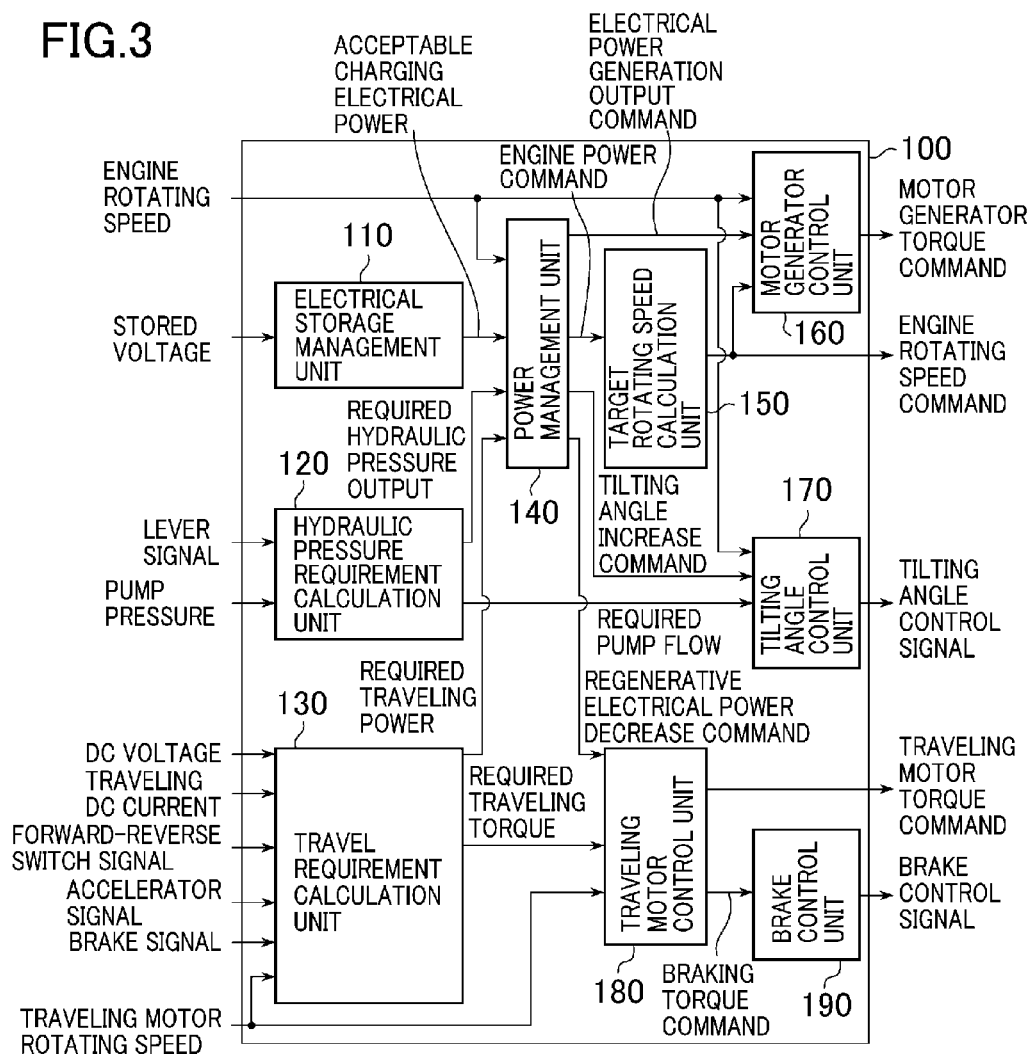
FIG. 3 is a block diagram of a main controller 100 associated with the first embodiment of the present invention.

FIG. 3 is a block diagram of the main controller 100 associated with the first embodiment of the present invention. The main controller 100 shown in this drawing includes an electrical storage management unit 110, hydraulic pressure requirement calculation unit 120, a travel requirement calculation unit 130, a power management unit 140, a target rotating speed calculation unit 150, a motor generator control unit 160, a tilting angle control unit 170, a traveling motor control unit 180, and a brake control unit 190.

Figure 4:
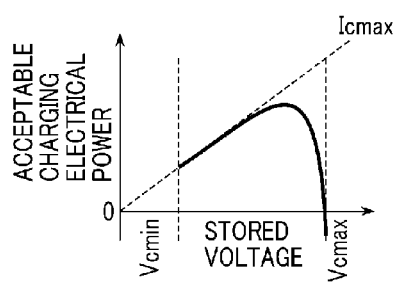
FIG. 4 is an illustration showing a typical acceptable charging electrical power map.

The electrical storage management unit 110 is a unit that calculates the acceptable charging electrical power of the capacitor 3. The stored voltage of the capacitor 3 is input to the electrical storage management unit 110 from the converter 4. The electrical storage management unit 110 calculates the acceptable charging electrical power based on the stored voltage in question and on an acceptable charging electrical power map (FIG. 4) stored in a storage device (not shown) inside the main controller 100. FIG. 4 is an illustration showing a typical acceptable charging electrical power map. In this drawing, $V_{cmin}$ and $V_{cmax}$ denote respectively a minimum voltage and a maximum voltage delimiting the range of use in which the capacitor 3 is least prone to deteriorate. First, the acceptable charging electrical power map is established to hold the acceptable charging electrical power at 0 or lower near the maximum voltage $V_{cmax}$ so that the stored voltage will not surpass the maximum voltage $V_{cmax}$. Meanwhile, $I_{cmax}$ in FIG. 4 represents a line based on a maximum current limit on the converter 4. Secondly, the acceptable charging electrical power map is established to keep the acceptable charging electrical power smaller as the stored voltage becomes lower, so that the charging current will not surpass the maximum current limit $I_{cmax}$.

The hydraulic pressure requirement calculation unit 120 is a unit that calculates a required hydraulic pressure output $P_{wr\_pmp\_req}$ of the hydraulic pump 9. Lever signals are input to the hydraulic pressure requirement calculation unit 120 from the lift lever and bucket lever (operating device 31), and a pump pressure $P_{pmp}$ is input to the hydraulic pressure requirement calculation unit 120 from a pressure sensor 32 (see FIG. 1) installed interposingly between the hydraulic pump 9 and the control valve 11. For the purpose of simplifying the illustration, it is assumed hereunder that the operations of the steering wheel and steering cylinder 12 are not included in the calculations.

Figure 5:
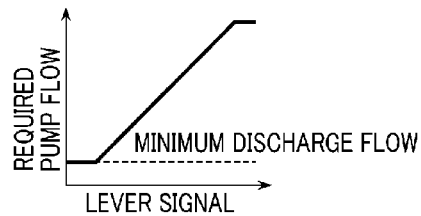
FIG. 5 is an illustration showing a typical required pump flow map.

FIG. 5 is an illustration showing a typical required pump flow map. The required pump flow map is established to make the required pump flow substantially proportional to the lever signal, and is stored in the storage device inside the main controller 100. First of all, the hydraulic pressure requirement calculation unit 120 calculates a required pump flow $q_{pmp\_req}$ based on the received lever signal and on the required pump flow map (FIG. 5). Next, the hydraulic pressure requirement calculation unit 120 calculates the required hydraulic pressure output $P_{wr\_pmp\_req}$ by the mathematical expression (1) below using the calculated required pump flow $q_{pmp\_req}$ and the received pump pressure $p_{pmp}$. It should be noted that the efficiency of the hydraulic pump 9 is not included in the calculations for the purpose of simplifying the illustration. Likewise, the consideration of efficiency will be excluded from the subsequent mathematical expressions.

[Math. 1]

$$P_{wr\_pmp\_req}=q_{pmp\_req} \cdot P_{pmp} \qquad (1)$$

The travel requirement calculation unit 130 is a unit that calculates a required traveling torque $T_{rq\_req}$ required of the traveling motor 7 during traveling and required driving power $P_{wr\_drv\_req}$ that is the power consumed or generated (regenerated) by the traveling motor 7 during traveling.

Figure 6:
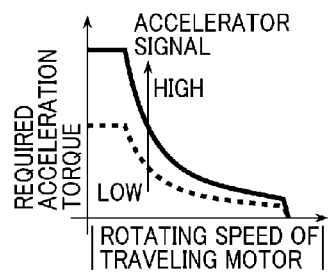
FIG. 6 is an illustration showing a typical required acceleration torque map.

FIG. 6 is an illustration showing a typical required acceleration torque map. Based on a maximum torque curve of the traveling motor 7, the required acceleration torque map is established in such a manner that required acceleration torque $T_{rq\_acc}$ remains proportional to an acceleration signal while inversely proportional to the absolute value of the number of traveling motor revolutions. As such, the required acceleration torque map is stored in the storage device inside the main controller 10. First, given the acceleration signal input from the accelerator pedal and the rotating speed $N_{mot}$ of the traveling motor 7 input from the converter 4, the travel requirement calculation unit 130 calculates the required acceleration torque $T_{rq\_acc}$ using the required acceleration torque map. Next, the travel requirement calculation unit 130 calculates the required traveling torque $T_{rq\_req}$ by the mathematical expression (2) below using the required acceleration torque $T_{rq\_acc}$ calculated earlier, a forward-reverse switch signal $V_{FNR}$ input from the forward-reverse switch, the rotating speed $N_{mot}$ of the traveling motor 7 input from the converter 4, and a brake signal $V_{brk}$ input from the brake pedal. It should be noted that "sign" in the expression denotes the signum function returning "1" when the argument is positive, "−1" when the argument is negative, or "0" when the argument is 0. The forward-reverse switch signal $V_{FNR}$ represents "1" when the forward-reverse switch is in the forward position, "−1" when the forward-reverse switch is in the reverse position, or "0" when the forward-reverse switch is in the neutral position. Also, $K_{brk}$ denotes a proportionality constant to be set beforehand so that acceleration and deceleration will be achieved by operation of the brake pedal without undue excess or deficiency.

[Math. 2]

$$T_{rq\_drv\_req}=\text{sign}(V_{FNR}) \cdot T_{rq\_acc} - \text{sign}(N_{mot}) \cdot K_{brk} \cdot V_{brk} \qquad (2)$$

Also, a DC voltage $V_{DC}$ is input to the travel requirement calculation unit 130 from the converter 4, and a traveling direct-current (DC) $I_{DC\_mat}$ is also input to the travel requirement calculation unit 130 from the traveling inverter 8. It should be noted that the traveling DC current flows on the electrical power line side of the traveling inverter 8 and is positive when consumed and negative when regenerated. The travel requirement calculation unit 130 calculates the required driving power $P_{wr\_drv\_req}$ by the mathematical expression (3) below using the DC voltage $V_{DC}$ and traveling DC current $I_{DC\_mot}$.

[Math. 3]

$$P_{wr\_drv\_req}=V_{DC} \cdot I_{DC\_mot} \qquad (3)$$

The power management unit 140 is a unit that calculates a tilting angle increase command $dD_{pmp\_t}$, a regenerative electrical power decrease command $dP_{wr\_mot\_t}$, a electrical power generation output command $P_{wr\_gen\_t}$, and an engine power command $P_{wr\_eng\_t}$. To the power management unit 140, the number of engine revolutions from the engine controller 2, the acceptable charging electrical power from the electrical storage management unit 110, the required hydraulic pressure output from the hydraulic pressure requirement calculation unit 120, and the required driving power from the travel requirement calculation unit 130 are input. Whereas the number of engine revolutions is received here and used in the calculation, the rotating speed of the motor generator 5 or of the hydraulic pump 9 may be received by way of a rotating speed detection means such as sensors and used in the calculation in place of the engine rotating speed, because the engine 1, motor generator 5 and hydraulic pump 9 are mechanically coupled with one another.

Figure 7:
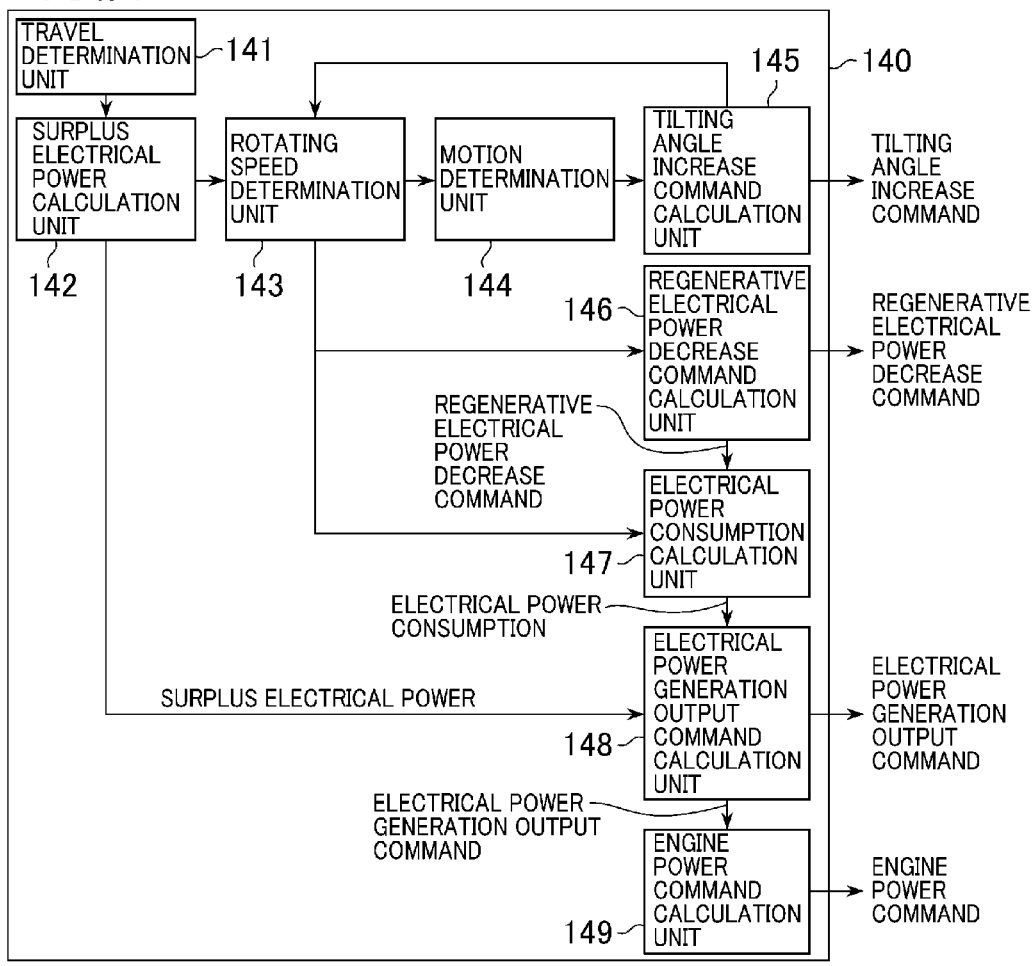
FIG. 7 is a block diagram of a power management unit 140 associated with the first embodiment of the present invention.

FIG. 7 is a block diagram of the power management unit 140 associated with the first embodiment of the present invention. In this drawing, the power management unit 140 includes a travel determination unit 141, a surplus electrical power calculation unit 142, a rotating speed determination unit 143, a motion determination unit 144, a tilting angle increase command calculation unit 145, a regenerative electrical power decrease command calculation unit 146, a electrical power consumption calculation unit 147, a electrical power generation output command calculation unit 148, and an engine power command calculation unit 149.

The travel determination unit 141 is a unit that determines whether the traveling generator 7 is power running or regenerating. Specifically, the travel determination unit 141 receives required driving power $P_{wr\_drv\_req}$ from the travel requirement calculation unit 130. If the required driving power $P_{wr\_drv\_req}$ is 0 or higher, power running during traveling is determined to be underway; if the required driving power $P_{wr\_drv\_req}$ is negative, regeneration during traveling is determined to be in progress.

When the travel determination unit 141 determines that regeneration during traveling is in progress, the surplus electrical power calculation unit 142 calculates surplus electrical power $P_{wr\_sup}$ which is generated by the traveling generator 7 during regenerative braking when the regenerative electrical power surpasses the acceptable charging electrical power of the capacitor 3. Acceptable charging electrical power $P_{wr\_chg\_max}$ is input to the surplus electrical power calculation unit 142 from the electrical storage management unit 110, and the required driving power $P_{wr\_drv\_req}$ is also input to the surplus electrical power calculation unit 142 from the travel requirement calculation unit 130. The surplus electrical power calculation unit 142 calculates the surplus electrical power $P_{wr\_sup}$ by the mathematical expression (4) below using the acceptable charging electrical power $P_{wr\_chg\_max}$ and the required driving power $P_{wr\_drv\_req}$. Also, by monitoring whether or not the surplus electrical power $P_{wr\_sup}$ calculated here is zero, it is possible to determine whether all regenerative electrical power produced by the traveling motor 7 can be charged into the capacitor 3 (i.e., whether or not the surplus electrical power $P_{wr\_sup}$ is generated). It should be noted that if the travel determination unit 141 determines that power running during traveling is in progress, the surplus electrical power $P_{wr\_sup}$ is set to 0.

[Math. 4]

$$P_{wr\_sup}=\max(|P_{wr\_drv\_req}|-P_{wr\_chg\_max},0) \quad (4)$$

When the travel determination unit 141 determines that regeneration during traveling is in progress, the rotating speed determination unit 143 determines whether or not the rotating speed $N_{eng}$ of the engine 1 is equal to or lower than a first set value $N_{eng\_th1}$ or further equal to or lower than a second set value $N_{eng\_th2}$. Here, the magnitude relationship between the first set value $N_{eng\_th1}$ and the second set value $N_{eng\_th2}$ is established so that "idling rotating speed of the engine 1<first set value $N_{eng\_th1}$<second set value $N_{eng\_th2}$<min (the highest rotating speed of the engine 1 and the highest rotating speed of the hydraulic pump 9)." The first set value $N_{eng\_th1}$ and the second set value $N_{eng\_th2}$ are stored in the storage device inside the main controller 100 and may be modified as needed. Incidentally, the rotating speed of the motor generator 5 or that of the hydraulic pump 9 may be used here in place of the rotating speed of the engine 1. The rotating speed determination unit 143 compares the rotating speed input from the means for detecting the rotating speed of the engine 1 (e.g., engine controller 2) with the first set value $N_{env\_th1}$ and the second set value $N_{eng\_th2}$. If the engine rotating speed $N_{eng}$ is equal to or lower than the first set value $N_{eng\_th1}$, low rotation mode is determined to be in effect; If the engine rotating speed $N_{eng}$ is higher than the first set value $N_{eng\_th1}$ and equal to or lower than the second set value $N_{eng\_th2}$, rotation inhibition mode is determined to be in effect; if the engine rotating speed $N_{eng}$ is higher than the second set value $N_{eng\_th2}$, high rotation mode is determined to be in effect. It should be noted that if the travel determination unit 141 determines that power running during traveling is underway, normal mode is determined to be in effect regardless of the magnitude of the engine rotating speed $N_{eng}$.

The motion determination unit 144 is a unit that determines whether any one of the hydraulic actuators 12, 13 and 14 is in motion. With this embodiment, the required hydraulic pressure output $P_{wr\_pmp\_req}$ calculated by the hydraulic pressure requirement calculation unit 120 is used in determining whether the hydraulic actuator 12, 13 or 14 is in motion. If the required hydraulic pressure output $P_{wr\_pmp\_req}$ turns out to be higher than a set value (e.g., pump pressure×minimum discharge flow), it is determined that the hydraulic actuator such as the lift cylinder 13 or bucket cylinder 14 is in motion. Although this embodiment utilizes the required hydraulic pressure output $P_{wr\_pmp\_req}$ in determining whether the hydraulic actuator 12, 13 or 14 is in motion, it is also possible to make the determination based on detection values from a means installed to detect whether a lever signal is output from the operating device 31 (e.g., the means may be a pressure sensor if the lever signal is a hydraulic pressure signal). As another alternative, a means may be installed to detect the speed of extension and contraction of the lift cylinder 13 and bucket cylinder 14, and the speed detected by this detection means may be used to make the determination.

The tilting angle increase command calculation unit 145 is a unit that calculates the tilting angle increase command $dD_{pmp\_t}$ to increase the tilting angle of the hydraulic pump 9 when: (i) the travel determination unit 141 determines that regeneration during traveling is in progress; (ii) the motion determination unit 144 determines that none of the hydraulic actuators 12, 13 and 14 is in motion while the motor generator 5 is being driven by the surplus electrical power from the traveling motor 7, and (iii) the rotating speed determination unit 143 determines that rotation inhibition mode or high rotation mode is in effect. The engine rotating speed $N_{eng}$ is input to the tilting angle increase command calculation unit 145 from the engine controller 2 (engine rotating speed detection means). The tilting angle increase command calculation unit 145 calculates the tilting angle increase command $dD_{pmp\_t}$ by the mathematical expression (5) below using the input engine rotating speed $N_{eng}$ and the first set value $N_{eng\_th1}$. In the mathematical expression (5), $K_{nD}$ is a proportionality constant. Even with the motor generator 5 being driven by the surplus electrical power from the traveling motor 7, if the motion determination unit 144 determines that any one of the hydraulic actuators 12, 13 and 14 is in motion, the tilting angle increase command $dD_{pmp\_t}$ is set to 0. Where the tilting angle increase command $dD_{pmp\_t}$ is calculated based on the mathematical expression (5), the higher the engine rotating speed $N_{eng}$ becomes, the higher the tilting angle increase command $dD_{pmp\_t}$ is set and the larger the capacity of the hydraulic pump 9 becomes. Thus raising the engine rotating speed $N_{eng}$ boosts the load torque of the hydraulic pump 9. However, if the travel determination unit 141 determines that power running during traveling is underway, the tilting angle increase command $dD_{pmp\_t}$ is set to 0.

[Math. 5]

$$dD_{pmp\_t}=\max\{K_{nD}(N_{eng}-N_{eng\_th1}),0\} \quad (5)$$

When the motor generator 5 is being driven by the surplus electrical power from the traveling motor 7 and when the rotating speed determination unit 143 determines that high rotation mode is in effect, the regenerative electrical power decrease command calculation unit 146 calculates the regenerative electrical power decrease command $dP_{wr\_mot\_t}$ to decrease the regenerative torque generated by the traveling motor 7. The engine rotating speed $N_{eng}$ is input to the regenerative electrical power decrease command calculation unit 146. The regenerative electrical power decrease command calculation unit 146 calculates the regenerative electrical power decrease command $dP_{wr\_mot\_t}$ by the mathematical expression (6) below using the input engine rotating speed $N_{eng}$ and the second predetermined rotating speed $N_{eng\_th2}$. In the mathematical expression (6), $K_{nP}$ is a proportionality constant. If the rotating speed determination unit 143 determines that normal mode, low rotation mode, or rotation inhibition mode is in effect, the regenerative electrical power decrease command $dP_{wr\_mot\_t}$ is set to 0. Where the regenerative electrical power decrease command $dP_{wr\_mot\_t}$ is calculated based on the mathematical expression (6), the higher the engine rotating speed $N_{eng}$ becomes, the higher the regenerative electrical power decrease command $dP_{wr\_mot\_t}$ is set and the lower the regenerative electrical power of the traveling motor 7 becomes. Thus raising the engine rotating speed $N_{eng}$ reduces the regenerative electrical power consumed by the motor generator 5.

[Math. 6]

$$dP_{wr\_mot\_t} = \max\{K_{nP}(N_{eng} - N_{eng\_th2}), 0\} \quad (6)$$

When the travel determination unit 141 determines that regeneration during traveling is in progress, the electrical power consumption calculation unit 147 calculates consumed electrical power $P_{wr\_cns}$, the power that is that part of the regenerative electrical power generated by the traveling motor 7, which is consumed by the motor generator 5. The surplus electrical power $P_{wr\_sup}$ is input to the electrical power consumption calculation unit 147 from the surplus electrical power calculation unit 142, and the regenerative electrical power decrease command $dP_{wr\_mot\_t}$ is also input to the electrical power consumption calculation unit 147 from the regenerative electrical power decrease command calculation unit 146. The electrical power consumption calculation unit 147 calculates the consumed electrical power $P_{wr\_cns}$ by the mathematical expression (7) below using the surplus electrical power $P_{wr\_sup}$ and the regenerative electrical power decrease command $dP_{wr\_mot\_t}$. It should be noted that if the travel determination unit 141 determines that power running during traveling is underway, the consumed electrical power $P_{wr\_cns}$ is set to 0.

[Math. 7]

$$P_{wr\_cns} = \max(P_{wr\_sup} - dP_{wr\_mot\_t}, 0) \quad (7)$$

The electrical power generation output command calculation unit 148 is a unit that calculates the electrical power generation output command $P_{wr\_gen\_t}$. Given the consumed electrical power $P_{wr\_cns}$ calculated by the electrical power consumption calculation unit 147, the electrical power generation output command calculation unit 148 calculates the electrical power generation output command $P_{wr\_gen\_t}$ by the mathematical expression (8) below.

[Math. 8]

$$P_{wr\_gen\_t} = \max(P_{wr\_drv\_req}, 0) - P_{wr\_cns} \quad (8)$$

The engine power command calculation unit 149 is a unit that calculates the engine power command $P_{wr\_eng\_t}$. The required hydraulic pressure output $P_{wr\_pmp\_req}$ coming from the hydraulic pressure requirement calculation unit 120 and the electrical power generation output command $P_{wr\_gen\_t}$ from the electrical power generation output command calculation unit 148 are input to the engine power command calculation unit 149. The engine power command calculation unit 149 calculates the engine power command $P_{wr\_eng\_t}$ by the mathematical expression (9) below using the required hydraulic pressure output $P_{wr\_pmp\_req}$ and the electrical power generation output command $P_{wr\_gen\_t}$.

[Math. 9]

$$P_{wr\_eng\_t} = P_{wr\_pmp\_req} + P_{wr\_gen\_t} \quad (9)$$

Returning to FIG. 3, the target rotating speed calculation unit 150 is a unit that calculates an engine rotating speed command $N_{eng\_}t$ to be sent to the engine controller 2. Based on the engine power command $P_{wr\_eng\_t}$ calculated by the engine power command calculation unit 149 and using an engine fuel consumption map, the target rotating speed calculation unit 150 calculates an operating point at which engine efficiency becomes the highest, and determines the engine rotating speed at that operating point to be the engine rotating speed command $N_{eng\_}t$. Upon receipt of the engine rotating speed command $N_{eng\_}t$, the engine controller 2 causes the engine 1 to rotate at the engine rotating speed designated by that engine rotating speed Command $N_{eng\_}t$.

The motor generator control unit 160 is a unit that calculates a motor generator torque command $T_{rq\_gen\_t}$ and transmits the calculated torque command to an inverter 6 in order to control the driving of the motor generator 5. To the motor generator control unit 160, the engine rotating speed $N_{eng}$ from the engine controller 2, the electrical power generation output command $P_{wr\_gen\_t}$ from the electrical power generation output command calculation unit 148, and the engine rotating speed command $N_{eng\_}t$ from the target rotating speed calculation unit 150 are input. The motor generator control unit 160 calculates the motor generator torque command $T_{rq\_gen\_t}$ by the mathematical expression (10) below using the engine rotating speed $N_{eng}$, the electrical power generation output command $P_{wr\_gen\_t}$ and the engine rotating speed command $N_{eng\_}t$, and transmits the calculated command to the generator inverter 6. It should be noted that $K_p$ denotes a proportional gain with respect to the deviation of the engine rotating speed. Also, a positive sign of the electrical power generation output command $P_{wr\_gen\_t}$ indicates that the motor generator 5 is generating, and a negative sign of the command indicates that the motor generator 5 is power running.

[Math. 10]

$$T_{rq\_gen\_t} = \max\{K_P(N_{eng\_t} - N_{eng}), 0\} - \frac{P_{wr\_gen\_t}}{N_{eng}} \quad (10)$$

The tilting angle control unit 170 is a unit that calculates a tilting angle control signal $V_{Dp\_t}$ and drives the tilting angle control valve of the hydraulic pump 9 based on the calculated control signal so as to control the tilting angle (capacity) of the hydraulic pump 9. To the tilting angle control unit 170, the engine rotating speed $N_{eng}$ from the engine controller 2, the required pump flow $q_{pmp\_req}$ from the hydraulic pressure requirement calculation unit 120, and the tilting angle increase command $dD_{pmp\_t}$ from the tilting angle increase command calculation unit 145 are input. The tilting angle control unit 170 calculates the tilting angle control signal $V_{Dp\_t}$ by the mathematical expression (11) below using the engine rotating speed $N_{eng}$, the required pump flow $q_{pmp\_req}$, and the tilting angle increase command $dD_{pmp\_t}$, thereby driving the tilting angle control valve of the hydraulic pump 9. It should be noted that in the mathematical expression (11), $K_{Dp}$ denotes a proportionality constant. Also, the tilting angle control signal $V_{Dp\_t}$ is established in such a manner that when the tilting angle increase command $dD_{pmp\_t}$ is 0 (when the motor generator 5 is being driven by the surplus electrical power from the traveling motor 7 and when one of the hydraulic actuators 12, 13 and 14 is in motion), the actual pump discharge flow is maintained at the required pump flow designated by the operator via the operating device 31. That is, in this case, the tilting angle of the hydraulic pump 9 is controlled to be small in keeping with an increase in the rotating speed of the engine 1, motor generator 5 or hydraulic pump 9 so that the discharge flow of the hydraulic pump is maintained at the value required by the operator (required pump flow).

[Math. 11]

$$V_{Dp\_t} = K_{Dp}\left(\frac{q_{pmp\_req}}{N_{eng}} + dD_{pmp\_t}\right) \quad (11)$$

The traveling motor control unit 180 calculates a traveling motor torque command $T_{rq\_mot\_t}$ and sends the calculated torque command to the traveling inverter 8 so as to control the power running and regeneration of the traveling motor 7. To the traveling motor control unit 180, the required traveling torque $T_{rq\_mot\_req}$ from the travel requirement calculation unit 130, the traveling motor rotating speed $N_{mot}$ from the converter 4, and the regenerative electrical power decrease command $dP_{wr\_mot\_t}$ from the regenerative electrical power decrease command calculation unit 146 are input. The traveling motor control unit 180 calculates the traveling motor torque command $T_{rq\_mot\_t}$ by the mathematical expression (12) below using the required traveling torque $T_{rq\_mot\_req}$, the traveling motor rotating speed $N_{mot}$ and the regenerative electrical power decrease command $dP_{wr\_mot\_t}$, and transmits the calculated command to the traveling inverter 8 to control the traveling motor 7.

[Math. 12]

$$T_{rq\_mot\_t} = \text{sign}(T_{rq\_mot\_req}) \cdot \max\left(|T_{rq\_mot\_req}| - \frac{dP_{wr\_mot\_t}}{|N_{mot}|}, 0\right) \quad (12)$$

Also, the traveling motor control unit 180 calculates a braking torque command $T_{rq\_brk\_t}$ by the mathematical expression (13) below using the calculated traveling motor torque command $T_{rq\_mot\_t}$, the required traveling torque $T_{rq\_mot\_req}$, and the traveling motor rotating speed $N_{mot}$. Where the braking torque command $T_{rq\_brk\_t}$ is calculated in this manner based on the mathematical expression (13), the higher the regenerative electrical power decrease command $dP_{wr\_mot\_t}$ becomes, the smaller the absolute value of the traveling motor torque command $T_{rq\_mot\_t}$ becomes; the braking torque command $T_{rq\_brk\_t}$ is made higher by as much as the amount of the reduction in the traveling motor torque command $T_{rq\_mot\_t}$ in question.

[Math. 13]

$$T_{rq\_brk\_t} = \max\{-\text{sign}(N_{mot}) \cdot (T_{rq\_mot\_req} - T_{rq\_mot\_t}), 0\} \quad (13)$$

The brake control unit 190 is a unit that calculates a brake control signal $V_{brk\_t}$ and drives the hydraulic brake control valve based on the calculated control signal $V_{brk\_t}$ to control the hydraulic brakes 30a, 30b, 30c and 30d. The brake control unit 190 calculates the brake control signal by the mathematical expression (14) below using the braking torque command $T_{rq\_brk\_t}$ calculated by the traveling motor control unit 180, thereby driving the hydraulic brake control valve. It should be noted that $K_{brk}$ is a proportionality constant established beforehand in such a manner that the braking torque command $T_{rq}$ brk$_t$ coincides with the actual braking torque.

[Math. 14]

$$V_{brk\_t} = K_{brk} T_{rq\_brk\_t} \quad (14)$$

Figure 8:
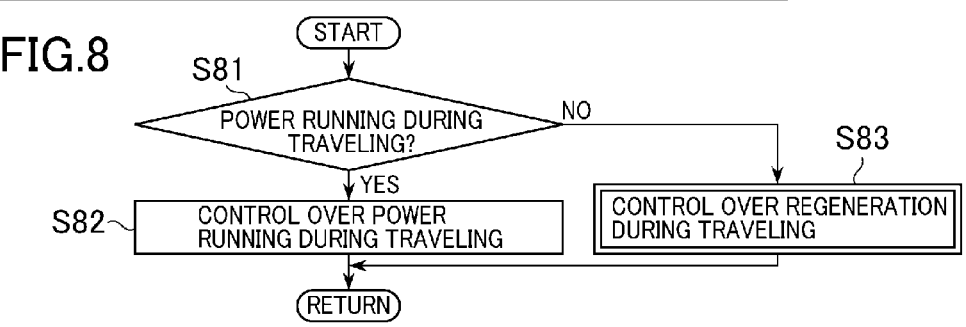
FIG. 8 is a flowchart of a process performed by the main controller 100 in the first embodiment of the present invention.

The process performed by the main controller 100 structured as described above is explained next in reference to the flowchart of FIG. 8. FIG. 8 is a flowchart of the process carried out by the main controller 100 of the first embodiment of the present invention. First, the travel determination unit 141 determines whether the traveling motor 7 is power running based on the required driving power $P_{wr\_drv\_req}$ calculated by the travel requirement calculation unit 130 (step 81). That is, if the required driving power $P_{wr\_drv\_req}$ is higher than 0, power running during traveling is determined to be underway and step 82 is reached. On the other hand, if the required driving power $P_{wr\_drv\_req}$ is negative, regeneration (not power running) during traveling is determined to be in progress and step 83 is reached.

In the control over power running during traveling in step 82, the traveling motor 7 is power running. The electrical power generation output command and the engine power command are thus calculated in order to supply the traveling motor 7 with necessary electrical power. The control over power running during traveling performed in step 82 is not directly relevant to this invention and thus will not be explained further.

In the control over regeneration during traveling in step 83, the traveling motor 7 is regenerating. The electrical power generation output command, engine power command, tilting angle increase command, and regenerative electrical power decrease command are calculated so as to distribute the electrical power regenerated by the traveling motor 7 to the capacitor 3 and motor generator 5. A detailed process performed in step 83 is explained next in reference to FIG. 9.

FIG. 9 is a detailed flowchart of regenerative control carried out in step 83 by the first embodiment of the present invention. As shown in this drawing, the surplus electrical power calculation unit 142 first calculates the surplus electrical power $P_{wr\_sup}$ and determines whether regenerative electrical power can all be charged into the capacitor 3 (step 831). Here, if the calculated surplus electrical power is other than 0, the charging is determined to be impossible and step 832 is reached. If the surplus electrical power is 0, the charging is determined to be possible and step 838 is reached (to be discussed later).

In step 832, the rotating speed determination unit 143 determines whether or not the engine rotating speed $N_{eng}$ is equal to or lower than the first set value $N_{eng\_th1}$. If the engine rotating speed $N_{eng}$ is determined to be higher than the first set value $N_{eng\_th1}$, step 833 is reached; if the engine rotating speed $N_{eng}$ is determined to be equal to or lower than the first set value $N_{eng\_th1}$, step 837 is reached.

In step 833, the motion determination unit 144 determines whether any one of the hydraulic actuators 12, 13 and 14 is in motion. Here, if none of the hydraulic actuators 12, 13 and 14 is determined to be in motion, step 834 is reached. If one of the hydraulic actuators 12, 13 and 14 is determined to be in motion, step 835 is reached.

In step 834, the tilting angle increase command calculation unit 145 calculates the tilting angle increase command $dD_{pmp\_t}$ (tilting angle increasing process). Here, the higher the engine rotating speed is, the larger the tilting angle increase command $dD_{pmp\_t}$ becomes because this command has been calculated as a value proportional to the magnitude of the difference between the engine rotating speed and the first set value $N_{eng\_th1}$ (see the mathematical expression (5)). The calculated tilting angle increase command $dD_{pmp\_t}$ is output to the tilting angle control unit 170. The tilting angle control unit 170 calculates the tilting angle control signal $V_{Dp\_t}$ based on the input tilting angle increase command $dD_{pmp\_t}$ and controls the tilting angle (capacity) of the hydraulic pump 9 in accordance with this control signal. At this point, the tilting angle of the hydraulic pump 9 is controlled to become larger as the tilting angle increase command becomes greater (see the mathematical expression (11)). If the tilting angle increasing process of step 834 is not carried out (i.e., if one of the hydraulic actuators 12, 13 and 14 is determined to be in motion), a value "0" is output to the titling angle control unit 170 as the tilting angle increase command $dD_{pmp\_t}$. The tilting angle of the hydraulic pump 9 is then made smaller as the engine rotating speed is raised, so that the discharge flow of the hydraulic pump 9 is maintained at the value required by the operator.

In step 835, the rotating speed determination unit 143 determines whether or not the engine rotating speed $N_{eng}$ is equal to or lower than the second set value $N_{eng\_th2}$. Here, if the engine rotating speed $N_{eng}$ is determined to be higher than the second set value $N_{eng\_th2}$, step 836 is reached; if the engine rotating speed $N_{eng}$ is determined to be equal to or lower than the second set value $N_{eng\_th2}$, step 837 is reached (to be discussed later).

In step 836, the regenerative electrical power decrease command calculation unit 146 calculates the regenerative electrical power decrease command $dP_{wr\_mot\_t}$. Here, the regenerative electrical power decrease command $dP_{wr\_mot\_t}$ becomes larger as the engine rotating speed becomes higher because this command has been calculated as a value proportional to the magnitude of the difference between the engine rotating speed and the second set value $N_{eng\_th2}$ (see the mathematical expression (6)). The calculated regenerative electrical power decrease command $dP_{wr\_mot\_t}$ is output to the traveling motor control unit 180. The traveling motor control unit 180 calculates the traveling motor torque command $T_{rq\_mot\_t}$ based on the input calculated regenerative electrical power decrease command $dP_{wr\_mot\_t}$ and outputs the calculated command to the traveling inverter 8 (regenerative electrical power decreasing process). In this manner, when the motor generator 5 is being driven by the surplus electrical power and when the engine rotating speed is higher than the second set value $N_{eng\_th2}$, the traveling motor control unit 180 causes the regenerative torque generated by the traveling motor 7 to become lower as the engine rotating speed becomes higher. This causes the surplus electrical power generated by the traveling motor 7 to become less than when the engine rotating speed is equal to or lower than the second set value $N_{eng\_th2}$.

At the same time, the traveling motor control unit 180 calculates the braking torque command $T_{rq\_brk\_t}$ and outputs the calculated command to the brake control unit 190. The brake control unit 190 calculates the brake control signal $V_{brk\_t}$ based on the input braking torque command $T_{rq\_brk\_t}$ and outputs the calculated command to the hydraulic brake control valve. In this manner, the brake control unit 190 causes the hydraulic brakes 30a, 30b, 30c and 30d to generate the braking torque corresponding to the regenerative torque of the traveling motor 7 reduced by the traveling motor control unit 180, so that the braking torque applied to the vehicle may be kept constant in a balanced manner even if the regenerative torque of the traveling motor 7 is decreased. If the regenerative electrical power decreasing process of step 836 is not carried out (i.e., if the engine rotating speed is equal to or lower than the second set value $N_{eng\_th2}$), a value "0" is output to the traveling inverter 8 as the regenerative electrical power decrease command $dP_{wr\_mot\_t}$.

In step 837, the electrical power consumption calculation unit 147 calculates the consumed electrical power $P_{wr\_cns}$ as that part of the surplus electrical power which is consumed by the motor generator 5, and outputs the consumed electrical power $P_{wr\_cns}$ thus calculated to the electrical power generation output command calculation unit 148. The consumed electrical power $P_{wr\_cns}$ calculated by the electrical power consumption calculation unit 147 represents the amount of surplus electrical power used to raise the engine rotating speed. If step 836 is carried out, the amount of power is reduced by as much as the amount of the decrease attained in the regenerative electrical power decreasing process. After the consumed electrical power $P_{wr\_cns}$ is output to the electrical power generation output command calculation unit 148, step 838 is reached.

In step 838, the electrical power generation output command calculation unit 148 calculates the electrical power generation output command $P_{wr\_gen\_t}$ and outputs the calculated electrical power generation output command $P_{wr\_gen\_t}$ to the motor generator control unit 160 and engine power command calculation unit 149. The motor generator control unit 160 in turn calculates the motor generator torque command $T_{rq\_gen\_t}$ based on the calculated electrical power generation output command $P_{wr\_gen\_t}$ thus input and transmits the calculated torque command to the inverter 6 so as to control the motor generator 5. If step 838 is reached immediately after step 831 (i.e., where there is no surplus electrical power generated), the motor generator 5 is driven by the torque proportional to the difference between the engine rotating speed command $N_{eng\_t}$ and the engine rotating speed $N_{eng}$. On the other hand, if step 838 is reached by way of step 837, the motor generator 5 is driven by the torque value lowered suitably by as much as the torque stemming from surplus electrical power. Thereafter, step 839 is reached.

In step 839, the engine power command calculation unit 149 calculates the engine power command $P_{wr\_eng\_t}$ based on the electrical power generation output command $P_{wr\_gen\_t}$ input from the electrical power generation output command calculation unit 148, and outputs the calculated power command to the target rotating speed calculation unit 150. The target rotating speed calculation unit 150 calculates the engine rotating speed command $N_{eng\_t}$ based on the input engine power command $P_{wr\_eng\_t}$ and outputs the calculated rotating speed command $N_{eng\_t}$ to the engine controller 2. The engine controller 2 causes the engine 1 to rotate at the engine rotating speed designated by the input engine command $P_{wr\_eng\_t}$. This completes step 839, control is returned to step 81, and the subsequent steps discussed above are repeated.

Figure 10A:
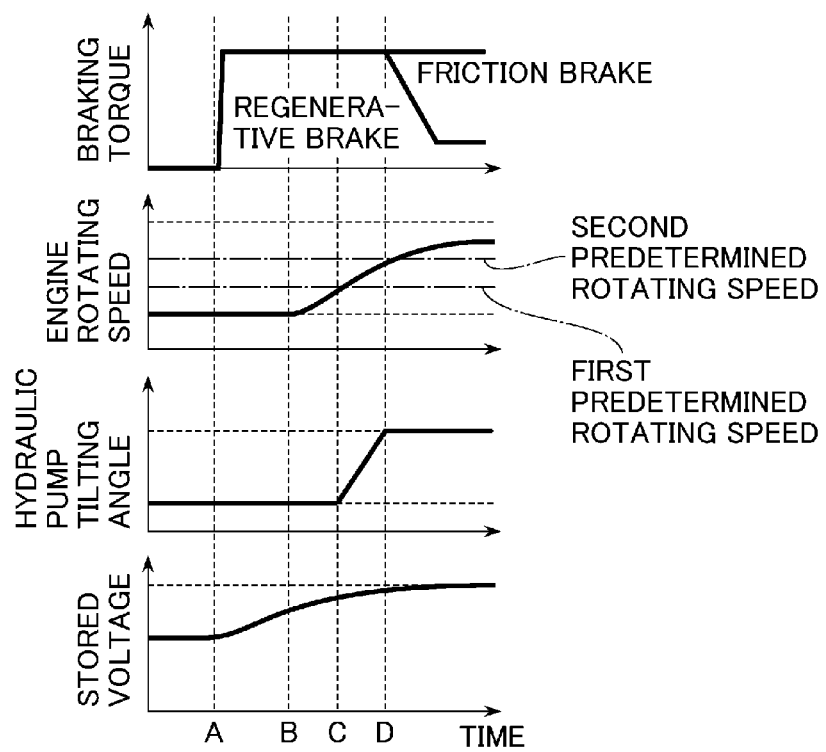
FIG. 10A is a set of illustrations showing how the construction vehicle associated with the first embodiment of the present invention typically operates (with a hydraulic actuator not in motion).

Some advantageous effects of the present invention are explained below using the relevant drawings showing examples in which the construction vehicle associated with the first embodiment of this invention typically operates. FIG. 10A shows an example in which the motion determination unit 144 determines that none of the hydraulic actuators 12, 13 and 14 is in motion, and FIG. 10B indicates an example in which the motion determination unit 144 determines that at least one of the hydraulic actuators 12, 13 and 14 is in motion.

In these drawings, time A denotes a point in time at which the construction vehicle starts braking. At time A, the regenerative electrical power generated by the traveling motor 7 upon regenerative braking is smaller than the acceptable charging electrical power of the capacitor 3. And time B represents a point in time at which the regenerative electrical power generated by the traveling motor 7 upon regenerative braking surpasses the acceptable charging electrical power of the capacitor 3. Time C indicates a point in time at which the engine rotating speed reaches the first set value $N_{eng\_th1}$. Time D stands for a point in time at which the engine rotating speed reaches the second set value $N_{eng\_th2}$.

At time A in FIG. 10A at which braking is started, the regenerative electrical power of the traveling motor 7 is smaller than the acceptable charging electrical power of the capacitor 3, so that processing is repeated from step 831 to step 838 to step 839, in that order. That is, all braking torque is output through the regenerative braking of the traveling motor 7. All regenerative electrical power generated at this time is charged into the capacitor 3, so that the stored voltage in the capacitor 3 is gradually increased.

When time B is later reached, the regenerative electrical power of the traveling motor 7 surpasses the acceptable charging electrical power of the capacitor 3, so that the processing is repeated from step 831 to step 832 to step 837 to step 838 to step 839, in that order. That is, the motor generator 5 is driven (power run) by surplus electrical power from the regenerative electrical power of the traveling motor 7, whereby the engine rotating speed is increased. As a result, past time B, the engine rotating speed gradually rises as the surplus electrical power is increased. This makes it possible for the motor generator 5 to consume the surplus electrical power from the regenerative electrical power, so that desired regenerative torque may be obtained through regenerative braking alone even if the regenerative electrical power surpasses the acceptable charging electrical power of the capacitor 3.

When time C is later reached, the engine rotating speed becomes higher than the first set value $N_{eng\_th1}$, so that the processing is repeated from step 831 to step 832 to step 833 to step 834 to step 835 to step 837 to step 838 to step 839, in that order. That is, the tilting angle increasing process (step 834) is carried out so that the higher the engine rotating speed is, the larger the hydraulic pump tilting angle becomes. This causes the hydraulic pump tilting angle (hydraulic pump capacity) to become larger and the load torque of the hydraulic pump 9 to become greater than before time C, so that the motor generator 5 can consume surplus electrical power even as that power is increased. Also, given the same engine rotating speed, more surplus electrical power is consumed when the pump capacity is larger. This makes it possible to prevent the over speed of the engine 1 and hydraulic pump 9 when the surplus electrical power is increased.

When time D is later reached, the engine rotating speed becomes higher than the second set value $N_{eng\_th2}$, so that the processing is repeated from step 831 to step 832 to step 833 to step 834 to step 835 to step 836 to step 837 to step 838 to step 839, in that order. That is, the regenerative electrical power decreasing process (step 836) is carried out so that the higher the engine rotating speed, the smaller the braking torque generated by the traveling motor 7 and that the amount of braking torque corresponding to the decreased braking torque is generated by the hydraulic brakes 30a, 30b, 30c and 30d. This makes it possible to inhibit the increase in the stored voltage and in the engine rotating speed while causing desired braking torque to be generated. Also, the attrition of the hydraulic brakes 30a, 30b, 30c and 30d may be lowered because these hydraulic brakes are used only if surplus electrical power cannot be consumed through the rise in the engine rotating speed and in the hydraulic pump tilting angle. Incidentally, the example of FIG. 10A shows that the tilting angle increasing process (step 834) is carried out in such a manner that past time D, the hydraulic pump tilting angle is kept constant at the value attained at time D.

Figure 10B:
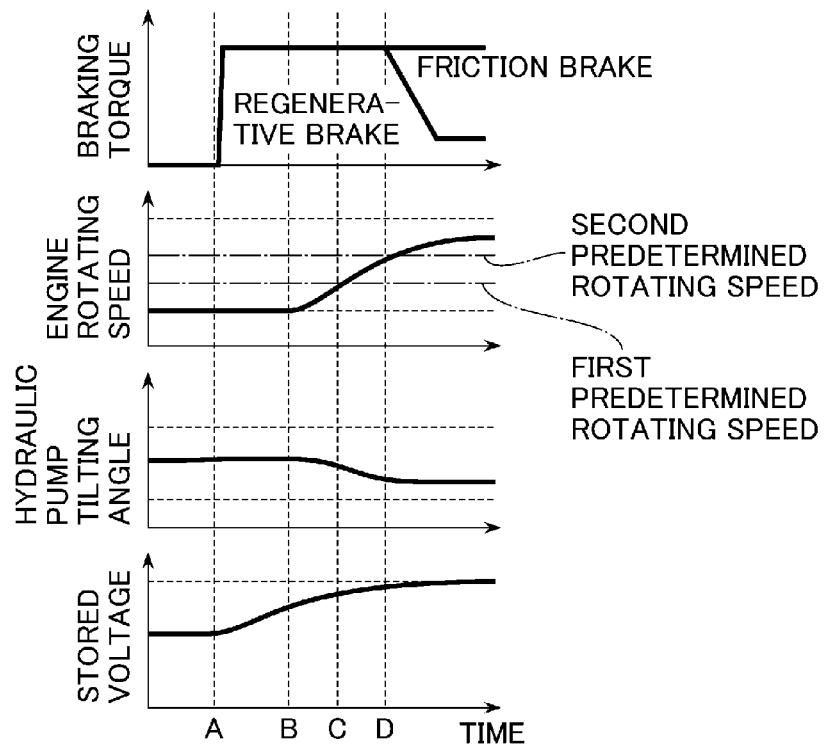
FIG. 10B is a set of illustrations showing how the construction vehicle associated with the first embodiment of the present invention typically operates otherwise (with the hydraulic actuator in motion).

Explained next is the case of FIG. 10B in which a hydraulic actuator is in motion. In this case, unlike in the case of FIG. 10A, the tilting angle control unit 170 performs control to maintain the discharge flow of the hydraulic pump 9 at the required pump flow designated by the operator. That is, as the engine rotating speed (hydraulic pump rotating speed) is raised, the hydraulic pump tilting angle (hydraulic pump capacity) is controlled to be reduced correspondingly. The operation is the same as in FIG. 10A up to time B because the engine rotating speed remains unchanged during that time period.

When time B is reached, the regenerative electrical power of the traveling motor 7 surpasses the acceptable charging electrical power of the capacitor 3, so that the processing is repeated from step 831 to step 832 to step 837 to step 838 to step 839, in that order. That is, the motor generator 5, driven (power run) by surplus electrical power from the regenerative electrical power of the traveling motor 7, raises the engine rotating speed. As a result, past time B, the engine rotating speed is gradually increased as the surplus electrical power is raised. Furthermore, the hydraulic pump tilting angle is gradually decreased in such a manner that the discharge flow of the hydraulic ump 9 is maintained at the required pump flow while the engine rotating speed is being increased. This allows the motor generator 5 to consume the surplus electrical power from regenerative electrical power, so that desired braking torque is obtained through regenerative braking alone even if the regenerative electrical power surpasses the acceptable charging electrical power of the capacitor 3. Incidentally, the flow of the fluid supplied from a constant-capacity hydraulic pump is generally proportional to the rotating speed of the hydraulic pump, i.e., the engine rotating speed. However, when the hydraulic pump tilting angle (hydraulic pump capacity) is reduced in keeping with the increase in the engine rotating speed as discussed above, the flow of the fluid supplied to the hydraulic actuators 12, 13 and 14 is maintained even as the engine rotating speed is raised. This makes it possible to prevent irregularities involving the loss of operability due to the speed of the hydraulic actuators 12, 13 and 14 getting increased or decreased regardless of the operator's intentions.

When time C is later reached, the engine rotating speed becomes higher than the first set value $N_{eng\_th1}$ while at least one of the hydraulic actuators 12, 13 and 14 is in motion, so that the processing is repeated from step 831 to step 832 to step 833 to step 835 to step 837 to step 838 to step 839, in that order. That is, the tilting angle increasing process (step 834) is not carried out because at least one of the hydraulic actuators 12, 13 and 14 is in motion. In the same manner as past time B, the hydraulic pump tilting angle is thus gradually decreased as the engine rotating speed is being increased.

When time D is later reached, the engine rotating speed becomes higher than the second set value $N_{eng\_th2}$, so that the processing is repeated from step 831 to step 832 to step 833 to step 835 to step 836 to step 837 to step 838 to step 839, in that order. That is, the regenerative electrical power decreasing process (step 836) is carried out so that the higher the engine speed, the lower the braking torque generated by the traveling motor 7 and that the amount of braking torque corresponding to the decreased braking torque is generated by the hydraulic brakes 30a, 30b, 30c and 30d. This makes it possible, as in the case of FIG. 10A, to inhibit the increase in the stored voltage and in the engine rotating speed while causing desired braking torque to be generated. Also, the attrition of the hydraulic brakes 30a, 30b, 30c and 30d may be lowered because the occasions on which these hydraulic brakes are used can be reduced.

Thus according to this embodiment structured as explained above, when surplus regenerative electrical power that cannot be charged into the capacitor 3 is generated by the construction vehicle furnished with the motor generator 5 connected mechanically to the hydraulic pump 9 for driving the hydraulic actuators 12, 13 and 14, the surplus electrical power can be consumed by driving the motor generator 5. This reduces the occasions on which the hydraulic brakes 30a, 30b, 30c and 30d are operated so that the attrition of these hydraulic brakes is lowered. In the foregoing description, the tilting angle increasing process (step 834) and the regenerative electrical power decreasing process (step 836) were shown to be used as needed in keeping with the engine rotating speed and the status of the hydraulic actuators 12, 13 and 14. Alternatively, utilizing only one of the two processes still provides the above-described effect of lowering the attrition of the hydraulic brakes 30a, 30b, 30c and 30d.

Also with the above-described embodiment, the surplus electrical power generated by the traveling motor 7 may be consumed by the motor generator 5 which in turn may drive the engine 1 using the surplus electrical power in question. This lowers the power command for the engine 1 so that the fuel consumption of the engine 1 may be reduced.

Further with the above-described embodiment, if the regenerative electrical power generated by the traveling generator 7 surpasses the acceptable charging electrical power of the capacitor 3, the surplus electrical power is first used to drive the motor generator 5 thereby raising the engine rotating speed. Where the control over regeneration during traveling is carried out in this manner, it is possible to raise acceleration responsiveness if the control over power running during traveling is performed immediately thereafter (i.e., upon acceleration during traveling).

With the embodiment discussed above, the second set value $N_{eng\_th2}$ at which the traveling motor control unit 180 (regenerative electrical power decrease command calculation unit 146) starts lowering the regenerative torque of the generator 7 is set to be higher than the first set value $N_{eng\_th1}$ at which the tilting angle control unit 170 (tilting angle increase command calculation unit 145) starts increasing the tilting angle of the hydraulic pump 9. Alternatively, the first set value $N_{eng\_th1}$ may be set to be higher than the second set value $N_{eng\_th2}$. In this case, the capacity of the hydraulic pump 9 is increased after the regenerative electrical power generated by the traveling motor 7 is lowered. However, since there are fewer occasions on which braking is performed by the hydraulic brakes than in the case of a construction vehicle devoid of the above-described control function, it is still possible to reduce the attrition of the hydraulic brakes. However, if it is desired to further lower the load on the hydraulic brakes, then it is preferred that the second set value $N_{eng\_th2}$ be set to be higher than the first set value $N_{eng\_th1}$ (i.e., first set value<second set value) as explained above in connection with this embodiment. That is because where the first set value $N_{eng\_th1}$ and the second set value $N_{eng\_th2}$ are set in that manner, it is possible to increase the capacity of the hydraulic pump 9 before the regenerative electrical power generated by the traveling motor 7 starts getting lowered.

Figure 11:
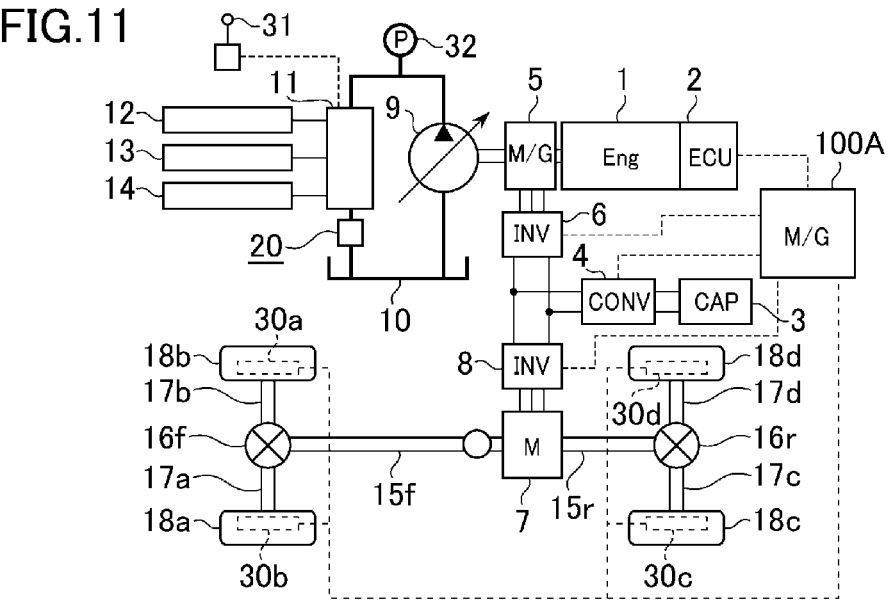
FIG. 11 is a block diagram of a construction vehicle associated with a second embodiment of the present invention.

The second embodiment of the present invention is explained next. FIG. 11 is a block diagram of a construction vehicle associated with the second embodiment of this invention. The construction vehicle of this embodiment is different from the construction vehicle of the first embodiment in that the vehicle in question includes an electromagnetic proportional valve 20 and a main controller 100A having a power management unit 140A; the other components of the construction vehicle are the same as those of the first embodiment. The components already shown in the above-explained drawings are designated by like reference numerals and their explanations are omitted hereunder.

The electromagnetic proportional valve (called the proportional valve hereunder) 20 is installed interposingly between the control valve 11 and the oil tank 10. The opening area of the proportional valve 20 is adjusted on the basis of a proportional valve throttle increase command $dS_{val\_t}$ output from the main controller 100A so as to change the discharge pressure of the hydraulic pump 9. That is, the proportional valve 20 functions as a pressure adjustment means for the hydraulic pump 9.

Figure 12:
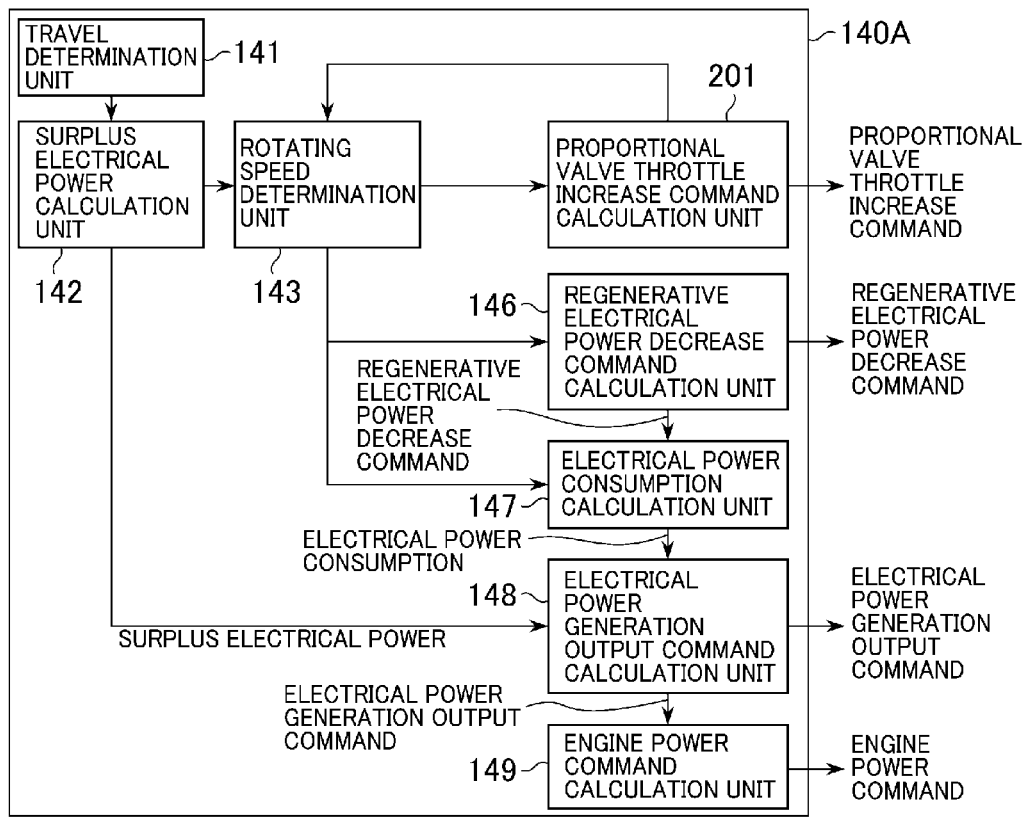
FIG. 12 is a block diagram of a power management unit 140A associated with the second embodiment of the present invention.

FIG. 12 is a block diagram of the power management unit 140A associated with the second embodiment of the present invention. As a variation of the power management unit 140 of the first embodiment, the power management unit 140A is devoid of the motion determination unit 144 and furnished with a proportional valve throttle increase command calculation unit 201 replacing the titling angle increase command calculation unit 145.

Figure 13:
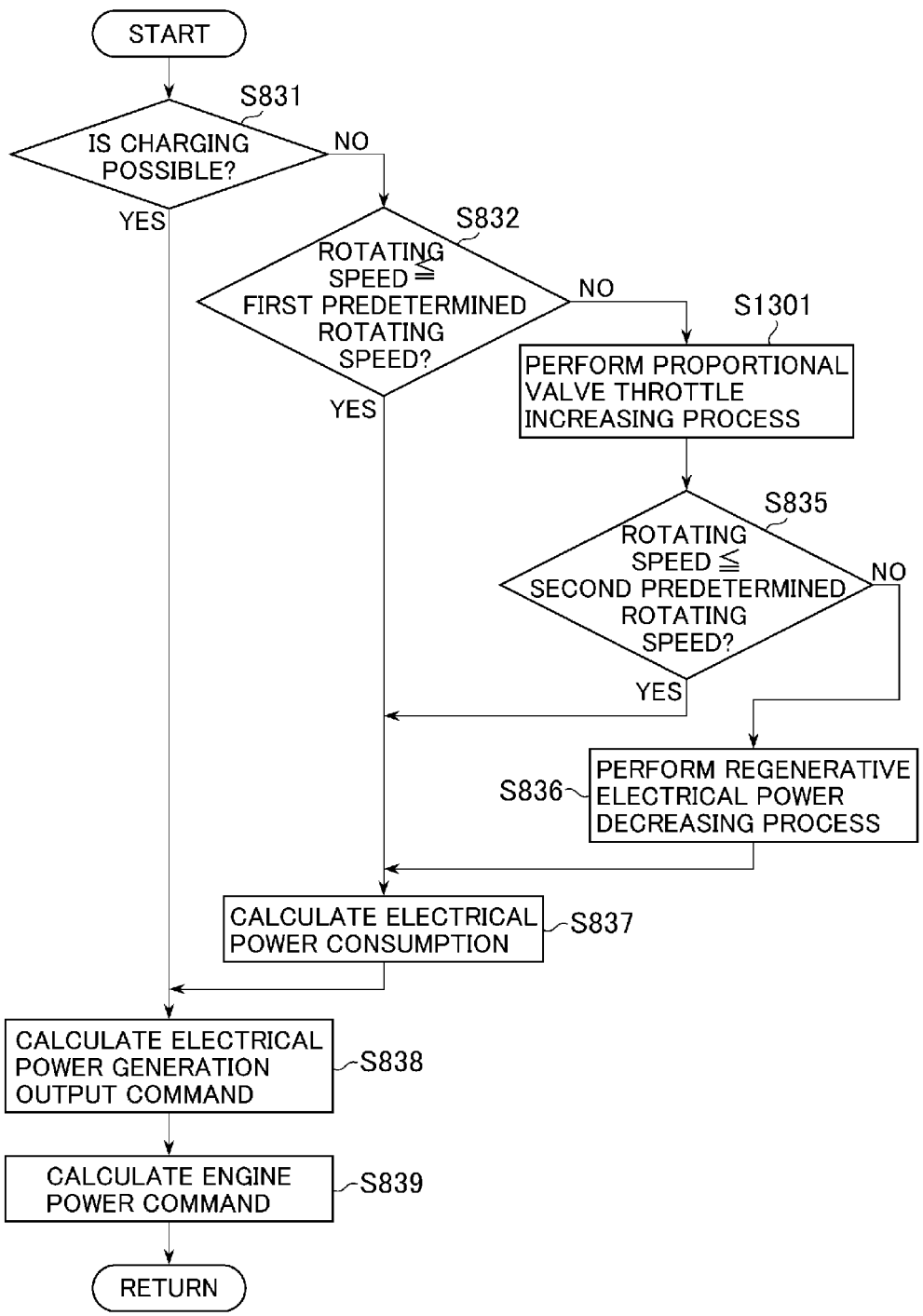
FIG. 13 is a specific flowchart of regenerative control performed in step 83 by the second embodiment of the present invention.

The proportional valve throttle increase command calculation unit 201 shown in FIG. 12 is a unit that calculates the proportional valve throttle increase command $dS_{val\_t}$ for controlling the opening area of the proportional valve 20. The engine rotating speed $N_{eng}$ is input to the proportional valve throttle increase command calculation unit 201 from the engine controller 2 (engine rotating speed detection means). The proportional valve throttle increase command calculation unit 201 calculates the proportional valve throttle increase command $dS_{val\_t}$ by the mathematical expression (15) below using the input engine rotating speed $N_{eng}$ and the first set value $N_{eng\_th1}$. In the mathematical expression (15), $K_{ns}$ is a proportionality constant that is set in such a manner that the maximum value of the proportional valve throttle increase command $dS_{val\_t}$ remains smaller than the relief pressure of the hydraulic circuit. Also, where the calculation in step 1301 of FIG. 13 is not carried out, the proportional valve throttle increase command is set to 0. Where the proportional valve throttle increase command $dS_{val\_t}$ is calculated based on the mathematical expression (15), the higher the engine rotating speed $N_{eng}$ becomes, the larger the proportional valve throttle increase command $dS_{val\_t}$ is set and the smaller the opening area of the proportional valve 20 is adjusted, so that the discharge pressure of the hydraulic pump 9 becomes higher and the load torque of the hydraulic pump 9 can be boosted. It is assumed here that the tilting angle control unit 170 of this embodiment calculates the mathematical expression (11) in which the tilting angle increase command $dD_{pmp\_t}$ is set to 0 and that the tilting angle control signal $V_{Dp\_t}$ is set to hold the actual pump discharge flow continuously at the required pump flow designated by the operator using the operating device 31.

[Math. 15]

$$dS_{val\_t}=\max\{K_{nS}(N_{eng}-N_{eng\_th1}),0\} \quad (15)$$

Explained next in reference to the flowchart of FIG. 13 is the process performed by the main controller 100A structured as described above. FIG. 13 is a detailed flowchart of regenerative control performed in step 83 by the second embodiment of the present invention. In this flowchart, the steps designated by the same reference numerals as those in FIG. 9 represent the same processes as in FIG. 9 and their explanations may be omitted where appropriate.

In step 832, the rotating speed determination unit 143 determines whether or not the engine rotating speed $N_{eng}$ is equal to or lower than the first set value $N_{eng\_th1}$. If the engine rotating speed $N_{eng}$ is determined here to be higher than the first set value $N_{eng\_th1}$, step 1301 is reached; if the engine rotating speed $N_{eng}$ is determined to be equal to or lower than the first set value $N_{eng\_th1}$, step 837 is reached (to be discussed later).

In step 1301, the proportional valve throttle increase command calculation unit 201 calculates the proportional valve throttle increase command $dS_{val\_t}$ (proportional valve throttle increasing process). Here, the higher the engine rotating speed is, the larger the proportional valve throttle increase command $dS_{val\_t}$ because the command is calculated to be a value proportional to the magnitude of the difference between the engine rotating speed and the first set value $N_{eng\_th1}$ (see the mathematical expression (15)). The calculated proportional valve throttle increase command $dS_{val\_t}$ is output to the proportional valve 20 so as to control the opening area of the proportional valve 20. At this point, the opening area of the proportional valve 20 is controlled to be smaller as the engine rotating speed is made higher. Thus the higher the engine rotating speed, the larger the load torque of the hydraulic pump 9. When step 1301 is terminated following the calculation of the proportional valve throttle increase command $dS_{val\_t}$, step 835 is reached.

Figure 14:
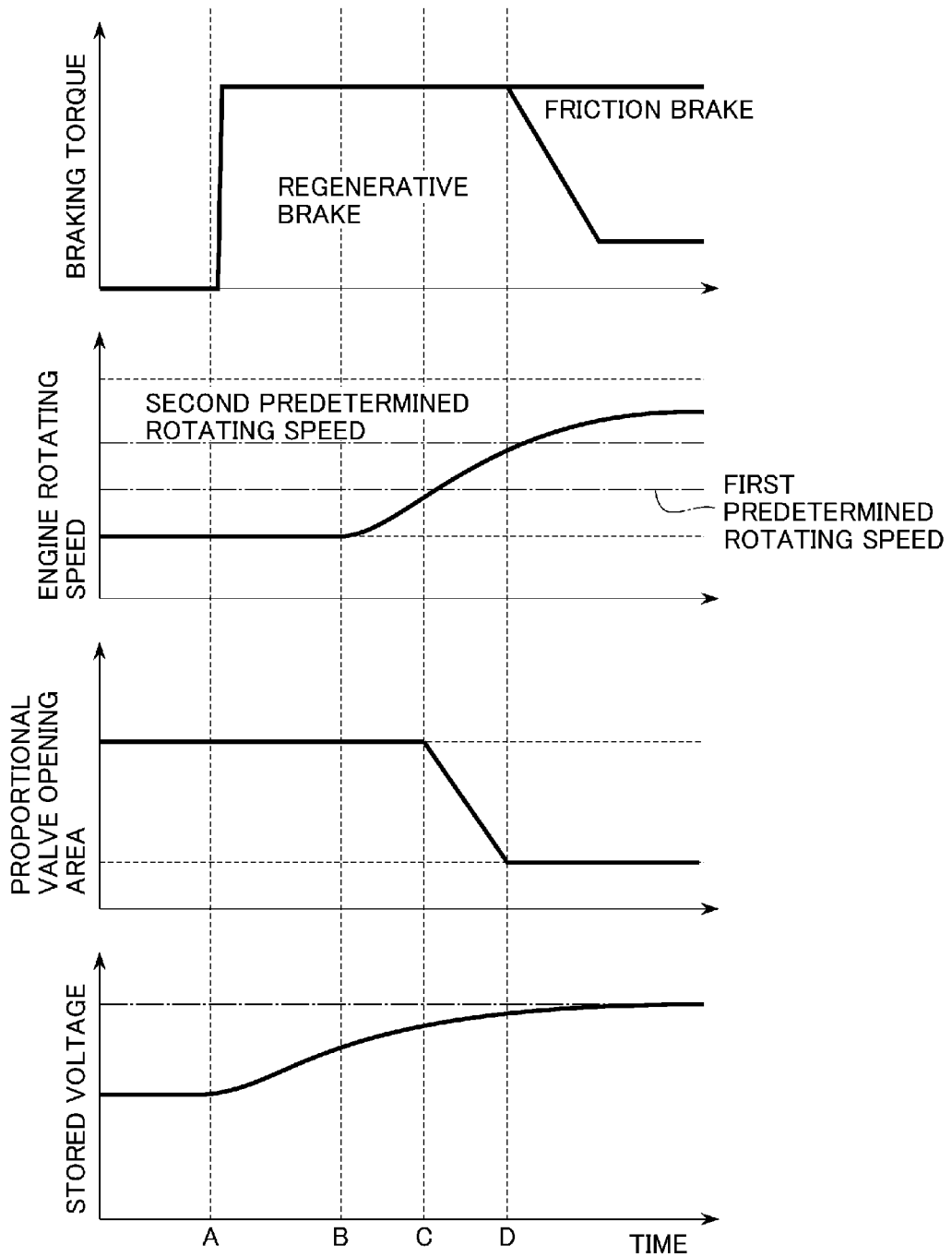
FIG. 14 is a set of illustrations showing how the construction vehicle associated with the second embodiment of the present invention typically operates.

Some advantageous effects of the present invention are explained below using the relevant drawings showing an example in which the construction vehicle associated with the second embodiment of this invention typically operates. FIG. 14 gives illustrations showing how the construction vehicle associated with the second embodiment of this invention typically works. Times A, B, C and D in FIG. 14 indicate the same timings as those in FIG. 10. With this embodiment, as shown in FIG. 14, the operation remains the same as in FIG. 10A up to time C at which the engine rotating speed surpasses the first set value $N_{eng\_th1}$.

When time C is reached, the engine rotating speed surpasses the first set value $N_{eng\_th1}$, so that the processing is repeated from step 831 to step 832 to step 1301 to step 835 to step 837 to step 838 to step 839, in that order. That is, the higher the engine rotating speed, the smaller the opening area of the proportional valve 20 because the proportional valve throttle increasing process (step 1301) is carried out. This causes the discharge pressure of the hydraulic pump 9 to become higher and the load torque of the hydraulic pump 9 to become greater than before time C, so that the motor generator 5 can consume surplus electrical power even as that power is increased. Also, given the same engine rotating speed, more surplus electrical power is consumed when the pump discharge pressure is higher. This makes it possible to prevent the over speed of the engine 1 and hydraulic pump 9 when the surplus electrical power is increased. When time D is later reached, the operation becomes the same as in FIG. 10A.

Thus with this embodiment, as with the first embodiment, there are fewer occasions on which the hydraulic brakes 30a, 30b, 30c and 30d are operated even when the surplus regenerative electrical power that cannot be charged into the capacitor 3 is generated, whereby the attrition of these hydraulic brakes is reduced. In particular, the control performed by this embodiment ensures that the discharge flow of the hydraulic pump 9 does not deviate from the required pump flow even if surplus electrical power is derived from the regenerative electrical power generated by the traveling motor 7. This eliminates the need to change controls, as with the first embodiment, depending on whether or not any one of the hydraulic actuators 12, 13 and 14 is in motion, which provides the advantage of simplifying the control performed by the main controller 100A.

With this embodiment, from the same viewpoint as that of the first embodiment, the second set value $N_{eng\_th2}$ should preferably be set to be higher than the first set value $N_{eng\_th1}$. And as with the first embodiment, the proportional value 20 and the related components can obviously be controlled based on the rotating speed of the motor generator 5 or of the hydraulic pump 9 instead of on the rotating speed of the engine 1.

Furthermore, although the first and the second embodiments discussed above were shown to use the capacitor 3 as a typical electrical storage device, this is not limitative of the present invention. Alternatively, batteries or the like may be utilized in place of the capacitor as the electrical storage device. Also, although the foregoing description gave examples in which the vehicle is furnished with the engine 1 (hybrid vehicle), this is not limitative of this invention. Alternatively, the vehicle may not be equipped with the engine 1. In this case, the rotating speed of the hydraulic pump 9 or of the motor generator 5 may be detected in place of the rotating speed of the engine 1 in order to control the construction vehicle appropriately.

Also, for the purpose of simplifying the illustration, if the rotating speed of the engine 1, motor generator 5 or hydraulic pump 9 becomes higher than the set value (second set value) while the motor generator 5 is being driven by surplus electrical power, the embodiments above were each shown to get the brake control unit 190 causing the hydraulic brakes 30a, 30b, 30c and 30d (braking device) to generate as much regenerative torque as the amount of the regenerative torque of the traveling motor 7 reduced by the traveling motor control unit 180. However, the torque balance for the construction vehicle as a whole need only be maintained in a substantially constant manner by raising the braking torque of the hydraulic brakes 30a, 30b, 30c and 30d in keeping with the reduction in regenerative torque made by the traveling motor control unit 180. There is no need to make the amount of regenerative torque reduced by the traveling motor control unit 180 coincide exactly with the amount of braking torque raised by the brake control unit 190.

DESCRIPTION OF REFERENCE NUMERALS

1 Engine
2 Engine controller
3 Capacitor
4 Converter
5 Motor generator
6 Generator inverter
7 Traveling motor
8 Traveling inverter
9 Hydraulic pump
11 Control valve
12, 13, 14 Hydraulic actuator
18 Wheel
20 Proportional valve
30 Hydraulic brake
31 Operating device
100 Main controller
110 Electrical storage management unit
130 Travel requirement calculation unit
141 Travel determination unit 142 Surplus electrical power calculation unit
142 Rotating speed determination unit
144 Motion determination unit
145 Tilting angle increase command calculation unit
146 Regenerative electrical power decrease command calculation unit
147 Electrical power consumption calculation unit
148 Electrical power generation output command calculation unit
149 Engine power command calculation unit
150 Target rotating speed calculation unit
160 Motor generator control unit
170 Tilting angle control unit
180 Traveling motor control unit
190 Brake control unit
201 Increase command calculation unit
$N_{eng\_th1}$ First set value
$N_{eng\_th2}$ Second set value

The invention claimed is:

1. A control apparatus for a construction vehicle equipped with an electrical storage device, a motor generator connected mechanically to an engine, a variable displacement hydraulic pump connected mechanically to the motor generator, a hydraulic actuator driven by fluid supplied from the hydraulic pump, a motor which is connected to the electrical storage device and to the motor generator by electrical power lines and which drives wheels, and a braking device for braking revolutions of the wheels, the control apparatus comprising:

a motor generator control unit which, when regenerative electrical power generated by the motor during regenerative braking surpasses acceptable charging electrical power of the electrical storage device, drives the motor generator using the surplus electrical power;

a motor control unit which, if the rotating speed of the engine, the motor generator, or the hydraulic pump becomes larger than a set value while the motor generator is being driven by the surplus electrical power, reduces regenerative torque generated by the motor, a brake control unit which, by driving the braking device, generates the same magnitude of braking torque as the regenerative torque reduced by the motor control unit, a motion determination unit which determines whether or not the hydraulic actuator is in motion, and a tilting angle control unit which, when the motion determination unit determines that the hydraulic actuator is not in motion and when the motor generator control unit drives the motor generator using the surplus electrical power, if the rotating speed of the engine, the motor generator, or the hydraulic pump becomes larger than another set value, then increases the tilting angle of the hydraulic pump as the rotating speed becomes larger.

2. The control apparatus for a construction vehicle according to claim 1, wherein the set value at which the motor control unit starts reducing the regenerative torque of the motor is higher than the another set value at which the tilting angle control unit starts increasing the tilting angle of the hydraulic pump.

3. The control apparatus for a construction vehicle according to claim 2, further comprising:

a pressure adjustment means which adjusts discharge pressure of the hydraulic pump, and a pressure control unit which, when the motor generator control unit drives the motor generator using the surplus electrical power, if the rotating speed of the engine, the motor generator, or the hydraulic pump becomes larger than another set value, then causes the pressure adjustment means to increase the discharge pressure of the hydraulic pump as the rotating speed becomes larger.

4. The control apparatus for a construction vehicle according to claim 3, wherein the set value at which the motor control unit starts reducing the regenerative torque of the motor is higher than the another set value at which the pressure control unit starts increasing the discharge pressure of the hydraulic pump.

* * * * *